WARREN TALBOT,
SVEN F. JERLSTROM,
INVENTORS

BY R. E. Geanque
ATTORNEY

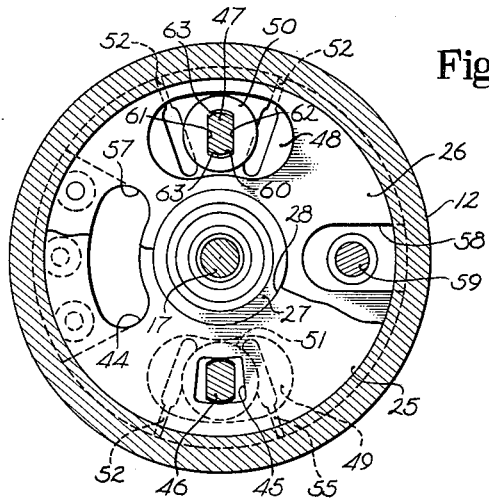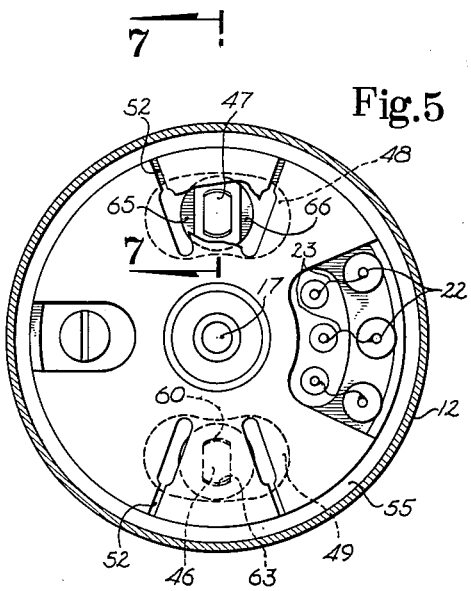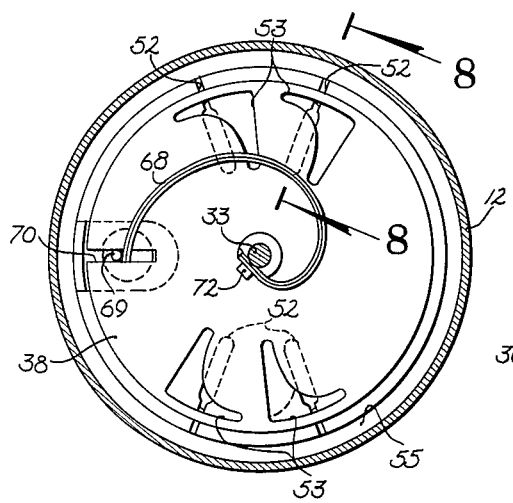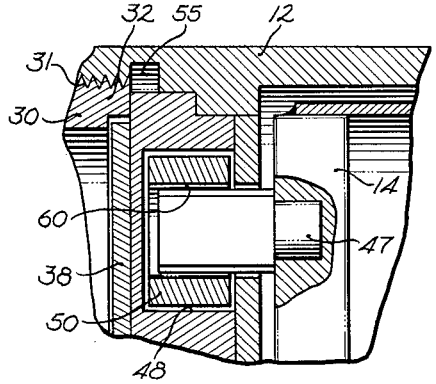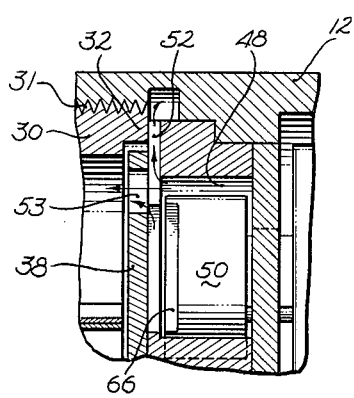

United States Patent Office
3,222,936
Patented Dec. 14, 1965

3,222,936
DAMPER MEANS FOR SINGLE-AXIS GYROSCOPE
Warren Talbot, Woodland Hills, and Sven F. Jerlstrom, Van Nuys, Calif., assignors, by mesne assignments, to Security First National Bank, Los Angeles, Calif., a national banking association
Filed June 4, 1962, Ser. No. 199,940
2 Claims. (Cl. 74—5.5)

This invention relates to an improved damper for a single-axis gyroscope and more particularly to an improved piston type damper for a rate gyroscope.

When a single-axis gyroscope is used as a rate gyroscope, the gimbal is restrained by a spring so that its output angle is proportional to the angular velocity of the vehicle to which it is attached. The dynamic response of the instrument depends upon the stiffness of the spring and upon the inertia of the wheel. A stiff spring leads to fast dynamic response at the expense of sensitivity, so that a design compromise must be made for each application. The dynamic response must be controlled and this is accomplished with some sort of damping restraint so that transient oscillations are promptly damped out. To provide a damping restraint, a device should be employed which will create a force that is proportional to the gimbal velocity without imparting undue friction.

Fluid shear between the gimbal and a clearance ring has been employed. Another method is to equip the gimbal with some form of a pump configuration that dissipates energy by pumping a fluid. Pump configurations are not widely used, however, because friction between the piston and the cylinder of the pump cannot be tolerated. This difficulty has been partly overcome by using a piston to produce a pumping type restraint with reduced friction values by rigidly affixing the piston to the gimbal and dragging it through a fluid contained in a damper cavity. One drawback to this type of damper restraint resides in the fact that friction between the piston and the damper cavity is still sufficient to necessitate sacrificing sensitivity of the spring of the instrument in order to minimize hunting. The device of the present invention, on the other hand, minimizes friction in a piston type damper by employing a piston which is made of a material with a density approaching the density of the fluid in the damper cavity and connecting the piston to the gimbal in such a manner that mechanical contact between the piston and the damper cavity is eliminated.

It is a primary object of the present invention to provide a new and improved piston type damper not subject to the disadvantages enumerated above and having a piston made of a material with a density approaching the density of the fluid in the damper cavity and to provide means which, when combined with the density of the piston, eliminates mechanical contact between the piston and the damper cavity.

Another object of the invention is to mount the piston of a piston type damper on a stud which, in turn, is rigidly affixed to the gimbal of a rate gyroscope in such a manner that the piston will be free to follow the configuration of the damper cavity without mechanical contact.

Still another object of the invention is to provide a device of the type described wherein a piston type damper is supported substantially weightlessly in such a manner that it does not form mechanical contact with the damper cavity as a result of acceleration of the gimbal or the force of gravity.

A further object of the invention is to provide an improved piston type damper for a rate gyroscope wherein a piston contains an oblong shaped slot through which a gimbal stud passes with a minimum of sidewall clearance and sufficient radial clearance to minimize mechanical contact of the piston with the walls of the damper cavities.

Another object of the invention is to minimize hunting in a rate gyroscope without sacrificing spring sensitivity.

These and other objects will appear upon reading the following specification and claims and upon considering in connection therewith the attached drawings to which they relate.

Referring now to the drawings in which a preferred embodiment of the invention is illustrated:

FIGURE 4 is a cross-sectional view taken along line 4—4 of FIGURE 3;

FIGURE 5 is a cross-sectional view taken along line 5—5 of FIGURE 3;

FIGURE 6 is a cross-sectional view taken along line 6—6 of FIGURE 3;

FIGURE 7 is a cross-sectional view, on an enlarged scale, taken along line 7—7 of FIGURE 5; and FIGURE 8 is a cross-sectional view, on an enlarged scale, taken along line 8—8 of FIGURE 6.

Figure 1:
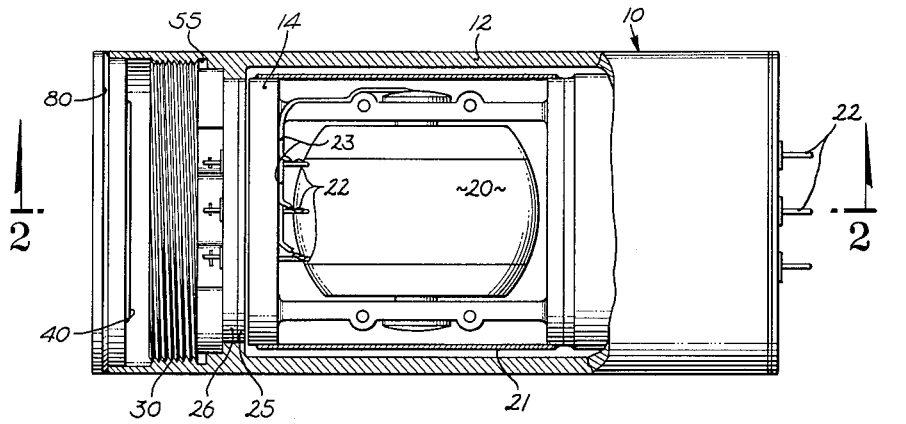
FIGURE 1 is a plan view of a rate gyroscope with portions of the cover removed to expose internal parts.
Figure 2:
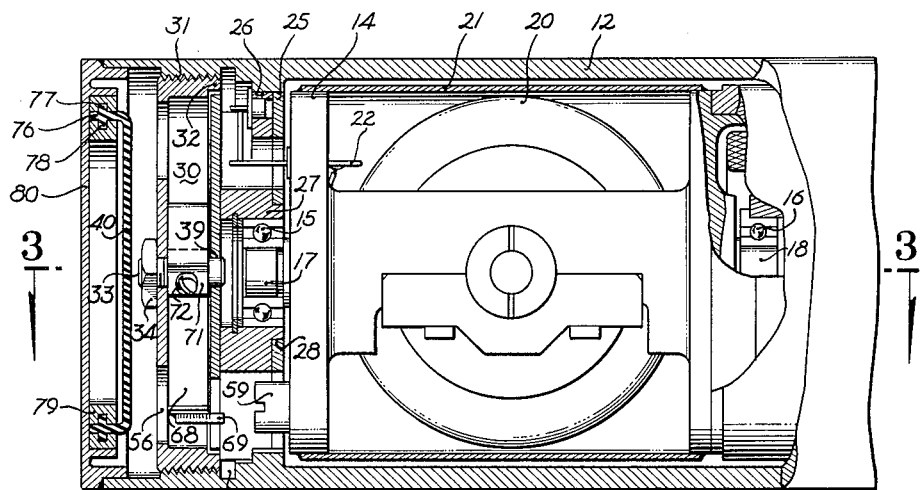
FIGURE 2 is an enlarged scale, cross-sectional view, partly in elevation, taken along line 2—2 of FIGURE 1.
Figure 3:
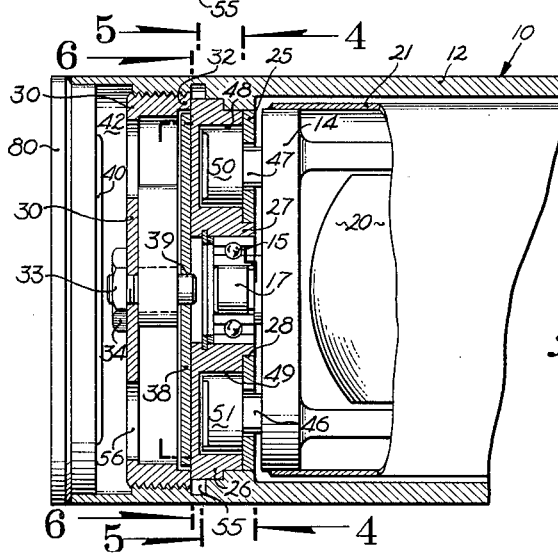
FIGURE 3 is a partial cross-sectional view, partly in elevation, taken along line 3—3 of FIGURE 2.

Referring again to the drawings and particularly to FIGURES 1–3, the gyroscope constituting the present invention, generally designated 10, includes a cylindrical casing 12 in which a gimbal 14 is suspended in bearings 15 and 16 by means of suitable shafts 17 and 18, respectively. A rotor 20 is rotatably mounted within the gimbal 14 and the gimbal and rotor assembly is sealed within a cylindrical jacket 21. The sealed assembly is floated within the casing 12 in a fluid, not shown. Electrical current may be supplied to the rotor 20 through a plurality of terminals 22 and electrical leads 23.

A gimbal end-plate 25 is mounted in the casing 12 adjacent one end of the gimbal 14. A damper plate 26 is mounted in the casing 12 adjacent the gimbal end-plate 25 and includes a hub portion 27 which carries the outer race for bearing 15 and which engages an aperture 28 in the gimbal end-plate 25. An externally threaded spring chamber 30 is secured by threads 31 near one end of the casing 12 and includes an annular lip 32 which contacts the damper plate 26 and maintains the damper plate 26 and the gimbal end-plate 25 in position in the casing 12. A threaded stud 33 has external threads at one end which threadedly engage an internally threaded aperture in the wall of the spring chamber 30 and is prevented from becoming un-threaded by means of a lock nut 34. An annular orifice end-plate 38 has an aperture 39 which rotatably engages the other end of the stud 33. The orifice plate 38 has a diameter which is smaller than the inside diameter of the annular lip 32 so that the orifice plate 38 may be rotated on the stud 33. An expansion bellows 40 is mounted in the end of the casing 12 and is spaced from the spring chamber 30 thereby forming an expansion chamber 42 between the bellows 40 and the spring chamber 30.

Referring now to FIGURES 4–8, the gimbal end-plate 25 includes a first shaped opening 44 through which the electrical leads 23 may extend and a second shaped opening 45 through which a first gimbal stud 46 may extend. While only one shaped opening 45 is shown in FIGURE 4, it is to be understood that a third shaped opening, which is identical in size and shape with the second opening 45, will be disposed in the gimbal end-plate 25 diametrically opposite thereof through which a second gimbal stud 47 extends. The damper plate 26 lies beneath the gimbal end-plate 25, as viewed in FIGURE 4, and includes a pair of damper cavities 48 and 49. Cylindrical pistons 50 and 51 are mounted on the gimbal studs 47 and 46, respectively, and extend into the cavities 48 and 49, respectively. The diameters of the pistons 50 and 51 are greater than that of the shaped openings 45 in the gimbal end-plate 25 so that appreciable amounts of fluid will not escape therethrough. The cavities 48 and 49 are filled with suitable fluid, such as a silicon fluid, having a density approaching that of the pistons 50 and 51 so that they are free to float therein. The cavities 48 and 49 have open sides adjacent the gimbal end-plate 25 and have shaped orifices 52 adjacent the orifice end-plate 38 which communicate with shaped orifices 53 in the end-plate. The orifices 52 in the cavities 48 and 49 communicate with an annular chamber 55 in the casing 12 and communicate with the spring housing 30 through the orifices 53. The spring housing 30, in turn, has apertures 56 opening into the expansion chamber 42. The damper plate 26 also includes one shaped opening 57 matching the opening 44 in the gimbal plate 25 which accommodates the electrical leads 23 and another shaped opening 58 which permits limited movement of a gimbal stop 59.

The pistons 50 and 51 each have an oblong slot 60 in which the gimbal studs 47 and 46 are mounted. The clearance between the sidewalls 61 and 62 of the oblong slots 60 and the gimbal studs is very close, approximating .002 inch, so that gimbal rotation is immediately opposed by the respective piston. The radial clearance 63 between the studs and top and bottom walls, on the other hand, must be fairly large so that normal radial run-out between the pistons 50 and 51 and the shaped sidewalls of the cavities 48 and 49 will not result in mechanical contact between the pistons and the sidewalls.

The dimensions of the damper cavities and pistons must be controlled such that minimum clearances, on the order of approximately .001 inch, are obtained at room temperature.

The pistons 50 and 51 each have two notches 65 and 66 (FIGURE 5) which leave a high spot in the middle of the piston so that fluid will still be free to flow out the shaped orifices 52 in the damper cavities 48 and 49 when the pistons 50 and 51 are swung to a position partially covering the orifices 52.

Referring now to FIGURES 3 and 6, a temperature responsive spring 68 has one end rigidly connected to a pin 69 which is mounted in a slot 70 in the orifice plate 38 and its other end rigidly affixed to the threaded stud 33 by means of a collar 71 and a set screw 72. The spring 68 is designed in such a manner that it will rotate the orifice plate 38 in a clockwise direction, as viewed in FIGURE 6, upon an increase in temperature of the fluid in contact therewith to expose less of the shaped orifices 53 to the path of flow of the fluid through the shaped orifices 52. The position of the shaped orifices 53 shown in FIGURE 6 represents the room temperature condition. The size of the shaped orifices 53 in fluid communication with the shaped orifices 52 governs the amount of pumping restraint imparted to the gimbal 14 through the pistons 50 and 51. At high temperatures, the only portion of the shaped orifices 52 exposed is that portion communicating with the annular chamber 55. As the temperature of the fluid decreases and its viscosity increases, a larger area of the shaped orifices 53 will be exposed and fluid will flow into the spring housing 30 and out the orifice 56 in the spring chamber into the expansion chamber 52. The shaped orifices 53 are sized with the shaped orifices 52 in such a manner that the minimum to maximum area exposed is 17 to 1 in a temperature range of $-165°$ F. to $+165°$ F.

The bellows 40 comprises a resilient, flexible diaphragm having an annular bottom wall 75 and an encompassing sidewall 76 which includes an outer annular collar 77 and an inner annular collar 78 near its lower edge which seats in a suitably shaped groove formed in an annular ring 79 which is pressed into an end cap 80.

Operation of the device will be readily understood. Assuming that the damper cavities 48 and 49 are filled with a suitable silicon fluid and that the orifice plate 38 is set for room temperature, as shown in FIGURE 6, then the pistons 50 and 51 will provide a damping restraint by exerting a pumping force on the fluid which is proportional to gimbal velocity. The spring 68 will move the orifice plate 38 to compensate for changes in temperature which change the viscosity of the fluid thereby affecting the pumping restraint. Friction is minimized because the pistons 50 and 51, by being provided with the shaped slots 60, will conform to the radial path of the damper cavities 48 and 49, respectively, without touching the sidewalls thereof.

While the particular damper herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. A damper for a single-axis gyroscope having a gimbal swingably mounted on gimbal end plate means comprising:
    a fluid-containing, damper cavity mounted in said end plate means;
    A gimbal stud rigidly affixed to said gimbal in such a manner that said stud extends into said cavity; and
    a piston slidably mounted on said gimbal stud in said cavity, the density of said piston being approximately the same as the density of the fluid in said cavity.

2. The damper of claim 1 including also orifice means for controlling flow of fluid from said cavity.

References Cited by the Examiner
UNITED STATES PATENTS

| 1,273,799 | 7/1918 | Ford et al. | 74—5.37 X |
|-----------|--------|-------------|-----------|
| 2,834,213 | 5/1958 | Fredericks | 74—5.5 |

BROUGHTON G. DURHAM, *Primary Examiner.*

T. W. SHEAR, *Assistant Examiner.*